US008958824B2

(12) United States Patent
Yoon et al.

(10) Patent No.: US 8,958,824 B2
(45) Date of Patent: Feb. 17, 2015

(54) METHOD AND APPARATUS FOR PROVIDING INFORMATION AND COMPUTER READABLE STORAGE MEDIUM HAVING A PROGRAM RECORDED THEREON FOR EXECUTING THE METHOD

(75) Inventors: Seung-hyun Yoon, Anyang-si (KR); Moon-sang Lee, Yongin-si (KR); Min-soo Koo, Seoul (KR); Ji-in Nam, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 42 days.

(21) Appl. No.: 13/348,746

(22) Filed: Jan. 12, 2012

(65) Prior Publication Data

US 2012/0208563 A1 Aug. 16, 2012

Related U.S. Application Data

(60) Provisional application No. 61/442,393, filed on Feb. 14, 2011.

(30) Foreign Application Priority Data

Jun. 29, 2011 (KR) ........................ 10-2011-0064081

(51) Int. Cl.
*H04W 24/00* (2009.01)
*H04M 3/42* (2006.01)
*H04L 29/08* (2006.01)
*G06F 17/30* (2006.01)
*G06Q 30/02* (2012.01)
*H04W 4/02* (2009.01)
*H04W 8/18* (2009.01)

(52) U.S. Cl.
CPC ............ *H04L 67/30* (2013.01); *G06F 17/3087* (2013.01); *G06Q 30/0261* (2013.01); *H04W 4/023* (2013.01); *H04W 8/186* (2013.01)
USPC .................................... 455/456.3; 455/414.1

(58) Field of Classification Search
USPC ............. 455/456.3, 414.1; 705/14.49, 57, 58, 705/64–67, 14.57, 14.58, 14.64–14.67
See application file for complete search history.

(56) References Cited

U.S. PATENT DOCUMENTS

| | | | | |
|---|---|---|---|---|
| 2001/0021998 | A1* | 9/2001 | Margulis | 725/81 |
| 2003/0163369 | A1* | 8/2003 | Arr | 705/14 |
| 2004/0171373 | A1* | 9/2004 | Suda et al. | 455/415 |
| 2004/0203616 | A1* | 10/2004 | Minear et al. | 455/412.1 |
| 2006/0148467 | A1* | 7/2006 | Kreitzer et al. | 455/426.1 |
| 2007/0071408 | A1* | 3/2007 | Ando et al. | 386/95 |
| 2008/0307052 | A1* | 12/2008 | Krishnan et al. | 709/205 |
| 2009/0017798 | A1* | 1/2009 | Pop | 455/414.1 |
| 2009/0076894 | A1* | 3/2009 | Bates et al. | 705/14 |
| 2009/0125377 | A1* | 5/2009 | Somji et al. | 705/10 |
| 2010/0114697 | A1* | 5/2010 | Athsani et al. | 705/14.49 |

* cited by examiner

*Primary Examiner* — Daniel Lai
(74) *Attorney, Agent, or Firm* — Sughrue Mion, PLLC

(57) ABSTRACT

A method and apparatus for providing information, and a computer readable storage medium having recorded thereon a program for executing the method, are provided. The method includes receiving information from at least one device included in a location-based group; transmitting information of the location-based group based on the received information to an external device; receiving at least one piece of targeting information regarding the location-based group based on the information of the location-based group from the external device; and outputting the received at least one piece of targeting information.

19 Claims, 12 Drawing Sheets

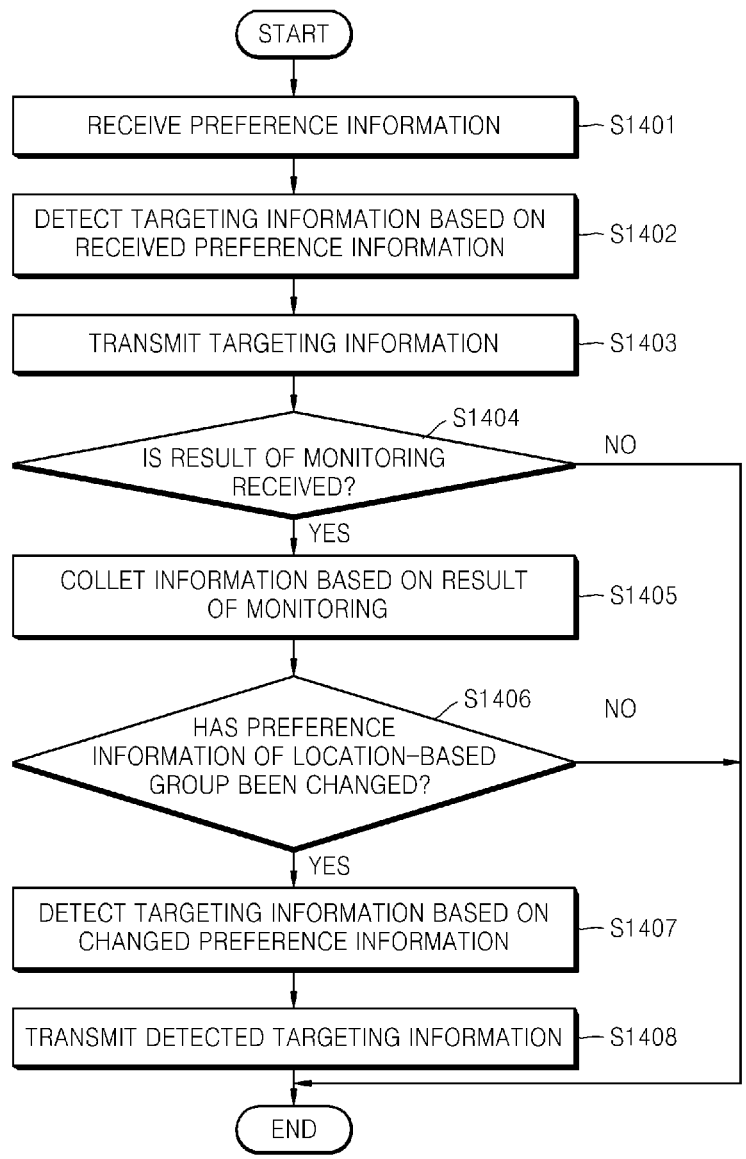

METHOD AND APPARATUS FOR PROVIDING INFORMATION AND COMPUTER READABLE STORAGE MEDIUM HAVING A PROGRAM RECORDED THEREON FOR EXECUTING THE METHOD

CROSS-REFERENCE TO RELATED PATENT APPLICATIONS

This application claims the benefit of U.S. Provisional Application No. 61/442,393, filed on Feb. 14, 2011, in the USPTO, and Korean Patent Application No. 10-2011-0064081, filed on Jun. 29, 2011, in the Korean Intellectual Property Office, the disclosures of which are incorporated herein in their entirety by reference.

BACKGROUND

1. Field

The present inventive concept relates to providing information. More particularly, the inventive concept relates to a method and apparatus for providing targeting information and to a computer readable storage medium having a program recorded thereon for executing the method.

2. Description of the Related Art

As web technologies and social network services have recently developed, a variety of technologies have been suggested for providing information targeted at a person, based on personal information. For example, technologies for providing information targeted at a user of a mobile phone based on user information of the mobile phone, or technologies for providing information targeted at a user of a social network service, have been suggested such as Facebook™, based on a web page used by the user of the social network service.

SUMMARY

The present inventive concept provides a method and apparatus for providing information targeted at a location-based group, and a computer readable storage medium having a program recorded thereon for executing the method.

The present inventive concept also provides a method and apparatus for providing targeting information based on shared data of a location-based group, and a computer readable storage medium having a program recorded thereon for executing the method.

The present inventive concept also provides a method and apparatus for providing targeting information according to one or more preferences of a location-based group, and a computer readable storage medium having a program recorded thereon for executing the method.

According to an aspect of the present inventive concept, there is provided a method of providing information, including: receiving information from at least one device included in a location-based group; transmitting information of the location-based group based on the received information to an external device; receiving at least one piece of targeting information regarding the location-based group based on the information of the location-based group from the external device; and outputting the received at least one piece of targeting information.

The method may further include: after outputting the targeting information, monitoring a plurality of devices included in the location-based group; transmitting a result of monitoring to the external device; and in response to at least one piece of targeting information regarding the location-based group being received from the external device based on the result of monitoring, outputting the received at least one piece of targeting information.

The monitoring of the plurality of devices may include at least one of determining whether a device included in the location-based group has been changed and determining whether information received from the at least one device has been changed.

The information received from the at least one device may include at least one of information regarding data shared between the plurality of devices included in the location-based group and user information of the plurality of devices included in the location-based group.

The shared data may include data clipped through the use of a clipping function of the at least one device.

The information of the location-based group may include preference information of the plurality of devices included in the location-based group, information regarding the data shared between the plurality of devices included in location-based group, and user information of the devices included in the location-based group.

The information of the location-based group may include preference information based on information regarding data shared between the plurality of devices included in the location-based group.

The transmitting information of the location-based group based on the received information to an external device may include: when the received information is information regarding data shared between the plurality of devices included in the location-based group, detecting preference information of the location-based group based on the information regarding the shared data; and transmitting the preference information as information of the location-based group to the external device.

When the method is performed using one of the plurality of devices included in the location-based group, the outputting of the received at least one piece of targeting information may include one of outputting the received at least one piece of targeting information by using the plurality of devices and outputting the received at least one piece of targeting information by using a display device disposed adjacent to the plurality of devices.

The method may be performed by a device disposed adjacent to the plurality of devices included in the location-based group; the outputting of the received at least one piece of targeting information includes outputting the received at least one piece of targeting information by using the device, and the device has a display function.

The targeting information may include at least one piece of information from advertising and local information.

According to another aspect of the present inventive concept, there is provided an apparatus for providing information, including: a first communication unit for performing communication with at least one device included in a location-based group; a second communication unit for performing communication with an external device; and a processor for transmitting information of the location-based group based on the information received from the at least one device via the first communication unit to the external device via the second communication unit, for receiving at least one piece of targeting information regarding the location-based group based on the information of the location-based group from the external device, and for outputting the received at least one piece of targeting information.

After outputting the at least one piece of targeting information, the processor may monitor a plurality of devices included in the location-based group via the first communication unit and transmits a result of monitoring to the external device via the second communication unit, and in response to at least one piece of targeting information regarding the location-based group being received from the external device based on the result of monitoring via the second communication unit, the processor may output the received at least one piece of targeting information.

The apparatus may be a device disposed adjacent to the plurality of devices included in the location-based group and may further include an output unit for outputting the received at least one piece of targeting information.

The apparatus may be one from the plurality of devices included in the location-based group, and the processor may output the received at least one piece of targeting information by using the plurality of devices.

According to another aspect of the present inventive concept, there is provided a computer readable storage medium having a program recorded thereon for executing a method of providing information, wherein the method of providing information is performed as in the method as described above.

BRIEF DESCRIPTION OF THE DRAWINGS

The above and other features and advantages of the present inventive concept will become more apparent by describing in detail exemplary embodiments thereof with reference to the attached drawings in which:

FIG. 14 is a flowchart illustrating a method of providing information to an external device, according to another embodiment of the present invention.

DETAILED DESCRIPTION

The present inventive concept will now be described more fully with reference to the accompanying drawings, in which exemplary embodiments of the invention are shown.

Figure 1:
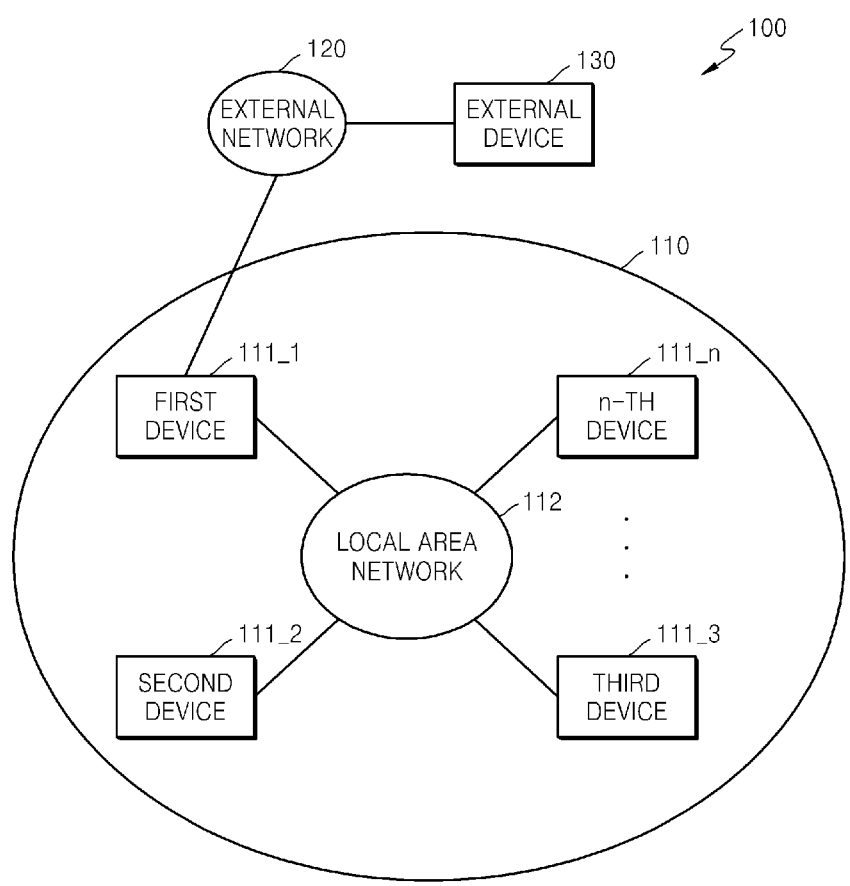
FIG. 1 illustrates a structure of a network in which an apparatus is used for providing information according to an exemplary embodiment of the present inventive concept.

FIG. 1 illustrates a structure of a network 100 in which an apparatus is used for providing information according to an exemplary embodiment of the present inventive concept. FIG. 1 illustrates a case where the apparatus for providing information is a first device 111_1 in FIG. 1 through n-th devices 111_1 to 111_n included in a location-based group 110. The network 100 illustrated in FIG. 1 includes the location-based group 110, an external network 120, and an external device 130.

The location-based group 110 illustrated in FIG. 1 may include first through n-th devices 111_1 to 111_n that are connected to a local area network (LAN) 112, such as an ad-hoc network, in a specific area and that may share data. The data that may be shared may include data clipped either on-line or off-line by using a clip function of each of the first through n-th devices 111_1 to 111_n. The clipped data may include data in which information stored in another device is clipped. The first through n-th devices 111_1 to 111_n may be devices, such as mobile nodes, mobile device, portable devices, and the like. The location-based group 110 may include a plurality of devices connected to the LAN 112 regardless of whether data sharing occurs.

The first through n-th devices 111_1 to 111_n included in the location-based group 110 may be changed as they move. For example, when the n-th device 111_n is disconnected from the LAN 112 as the n-th device 111_n moves, the location-based group 110 includes first through (n-1)-th devices 111_1 to 111_n-1.

In addition, when at least one new device is connected to the LAN 112 and shares data with the first through n-th devices 111_1 to 111_n, the location-based group 110 includes the first through n-th devices 111_1 to 111_n and the new device. As described above, when the location-based group 110 is defined regardless of data sharing, the new device may not share data with the first through n-th devices 111_1 through 111_n but may be connected to the LAN 112, thereby included in the location-based group 110.

The location-based group 110 may be generated according to at least date, time, and location. For example, a location-based group generated at 10 a.m. of a particular day in an area A and a location-based group generated at 11 a.m. of the particular day in the area A may be different from each other. In addition, the location-based group generated at 10 a.m. of the particular day in an area A and a location-based group generated at 9 p.m. of the particular day in an area B may be the same. Thus, the location-based group 110 illustrated in FIG. 1 may be referred to as a current location-based group.

When the location-based group 110 generated is based on data sharing and no device for sharing data exists among devices connected to the LAN 112, the location-based group 110 may not be cancelled or deleted. When the location-based group 110 is generated based on a connection to the LAN 112 and no device is connected to the LAN 112, the location-based group 110 may not be cancelled or deleted. When the first device 111_1 that acts as the apparatus for providing information in the location-based group 110 is disconnected from the LAN 112, the location-based group 110 may not be cancelled or deleted. When the first device 111_1 transfers the role of the apparatus for providing information to another device included in the location-based group 110 before it is disconnected from the LAN 112, the location-based group 110 may be retained.

Hereinafter, for convenience of explanation, the first device 111_1 illustrated in FIG. 1 will be described as the apparatus for providing information according to an exemplary embodiment of the present inventive concept. However, one from second through n-th devices 111_2 to 111_n illustrated in FIG. 1 may be used as the apparatus for providing information according to an exemplary embodiment. A device that plays the role of the apparatus for providing information according to an exemplary embodiment needs to have a function for connecting to an external network 120.

The external network 120 may be a wireless network, such as Wi-Fi or $3^{rd}$ Generation (3G), or may be a wired network, such as wired Internet.

An external device 130 may provide information targeted at the location-based group 110 and may be mentioned as a targeting information providing server. The targeting information may be stored in the external device 130, a database server (not shown) connected to the external device 130, or a storage unit (not shown) based on a cloud service. An operation of the external device 130 will be described in detail with reference to FIGS. 12 through 14 below.

When the location-based group 110 of FIG. 1 is generated based on data sharing, the first device 111_1 that plays the role of the apparatus for providing information, transmits information regarding data shared with the second through n-th devices 111_2~111_n via the LAN 112 or transmits preference information of the location-based group 110 based on the shared data, to the external device 130 via the external network 120. The first device 111_1 receives the targeting information regarding the location-based group 110 from the external device 130. Thus, the received targeting information may be output to each of the first through n-th devices 111_1 to 111_n.

Figure 2:
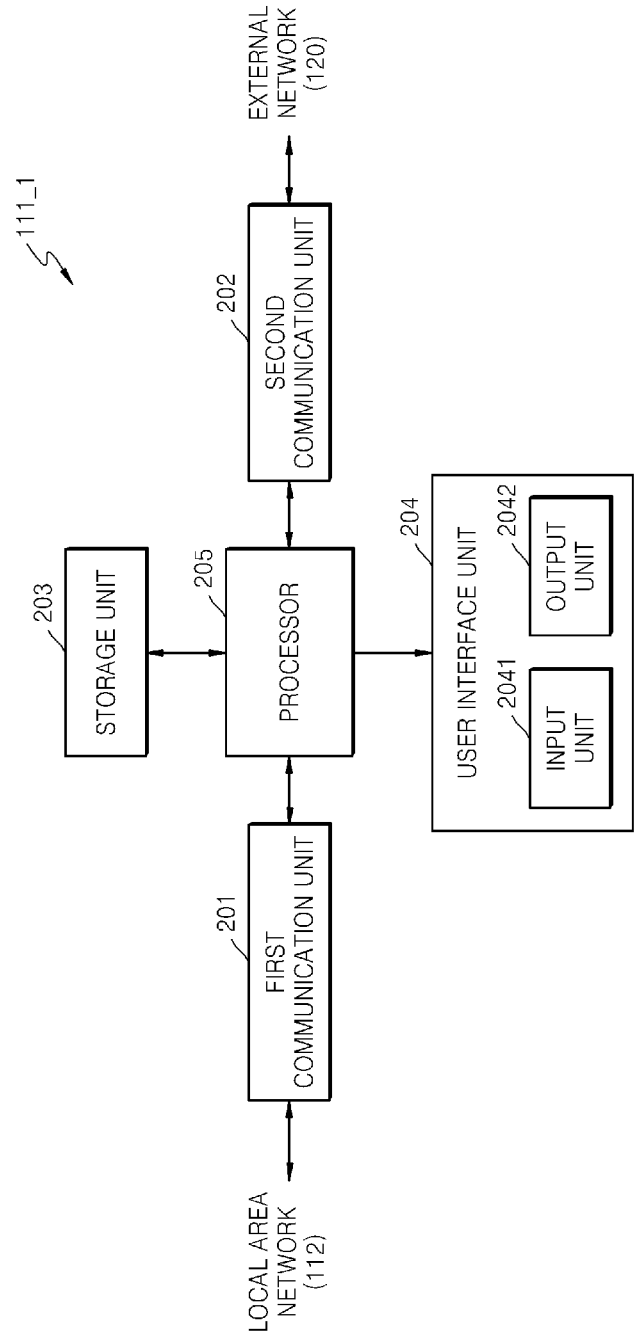
FIG. 2 is a functional block diagram of a first device illustrated in FIG. 1.

To this end, the first device 111_1 may be constituted, as illustrated in FIG. 2.

FIG. 2 is a functional block diagram of the first device 111_1. Referring to FIG. 2, the first device 111_1 may include at least a first communication unit 201, a second communication unit 202, a storage unit 203, a user interface unit 204 and a processor 205.

The first communication unit 201 performs communication between at least one device included in the location-based group 110 and the processor 205 via the LAN 112. That is, the first communication unit 201 performs data transmission and reception between the second through n-th devices 111_2 through 111_n included in the location-based group 110 and the processor 205. The first communication unit 201 may be referred to as a local area network interface unit. The first communication unit 201 may be constituted based on a communication technology used in the LAN 112. For example, when the LAN 112 is an ad-hoc network, the first communication unit 201 may be constituted to transmit and receive data between the second through n-th devices 111_2 to 111_n and the processor 205, based on Peer to Peer (P2P).

The second communication unit 202 performs communication between the external device 130 and the processor 205 via the external network 120. The second communication unit 202 may be constituted based on a communication technology used in the external network 120. For example, when the external network 120 is a wireless network, such as Wi-Fi or 3 Generation (3G), the second communication unit 202 may be constituted to transmit and receive data between the external device 130 and the processor 205 based on the wireless network. The second communication unit 202 may be an external network interface unit.

Program and data for executing a method of providing information according to an exemplary embodiment of the present invention may be stored in the storage unit 203. The program may be referred to as a code object. The program stored in the storage unit 203 may be stored in advance, but may also be controlled by the processor 205 and may be downloaded from an app store (not shown) connected via the second communication unit 202 or a particular web site (not shown) or a program providing server (not shown). The data stored in the storage unit 203 may include clip data collected off-line or on-line by using a clipping function of the first device 111_1, and data shared by the first through n-th devices 111_1 to 111_n via the LAN 112. The shared data may include clip data collected using a clipping function of each of the first through n-th devices 111_1 to 111_n.

The user interface unit 204 may include an input unit 2041 for inputting an input signal and an output unit 2042 for outputting an output signal. A signal input by the user interface unit 204 may be interpreted as a signal input by the input unit 2041. According to the present inventive concept, the input unit 2041 may input a command and/or information for collecting clip data on-line or off-line by using it's the clipping function of the first device 111_1 or may input a command and/or information for sharing data with a device connected to the LAN 112. In order to collect the clip data off-line, the input unit 2041 may have a camera-based function or a photographing-based function. When the input unit 2041 includes the camera-based function or the photographing-based function, the input unit 2041 may input a captured image as an input signal.

A signal output by the user interface unit 204 may be interpreted as a signal output by the output unit 2042. The output unit 2042 may be defined as a display device. When the output unit 2042 is a display device, the output unit 2042 may be a display device, such as a liquid crystal display (LCD), a light-emitting diode (LED), or active-matrix organic light-emitting diode (AM OLED). However, the user interface unit 204 is not limited to the above description.

The processor 205 is a processor for controlling all functions of the first device 111_1 and may be constituted as a controller, a microprocessor, a micro-controller, or the like, but is not limited thereto. The processor 205 may load the program for executing the method of providing information stored in the storage unit 203 and may execute the method of providing information according to an exemplary embodiment of the present inventive concept. The processor 205 may read data required for executing the method of providing information described above from the storage unit 203 and may use the data by loading the data on the processor 205. To this end, the processor 205 may include a memory or buffer for temporarily storing data.

Figure 3:
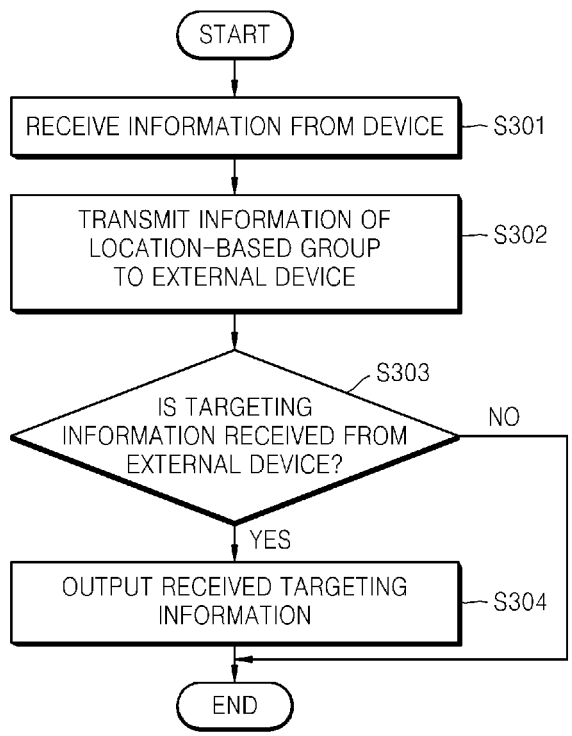
FIG. 3 is a flowchart illustrating a method of providing information by using an apparatus for providing information, according to an exemplary embodiment of the present inventive concept.

The processor 205 may execute a task for the method of providing information illustrated in a flowchart of FIG. 3. FIG. 3 is a flowchart illustrating a method of providing information by using an apparatus for providing information, according to an embodiment of the present invention. In FIG. 3, information targeted at the location-based group 110 by using information regarding the location-based group 110 based on information received from at least one device included in the location-based group 110, is provided to each of the first through n-th devices 111_1 to 111_n.

The processor 205 receives the information regarding the location-based group 110 from at least one device among the second through n-th devices 111_2 to 111_n included in the location-based group 110 via the first communication unit 201 in operation S301.

When the location-based group 110 is generated based on data shared between the first through n-th devices 111_1 to 111_n, the information received from the at least one device may include information regarding clip data shared between the first through n-th devices 111_1 to 111_n. Data sharing between the first through n-th devices 111_1 to 111_n may be performed using a service; such as an ad-hoc data sharing service. When the location-based group 110 is generated based on connected to the LAN 112 regardless of the shared data described above, the information received from the at least one device may include user information of the second through n-th devices 111_2 to 111_n.

Next, the processor 205 transmits the information of the location-based group 110 based on the received information to the external device 120 via the second communication unit 202 in operation S302. When the information received in operation S301 is information regarding clip data shared between the first through n-th devices 111_1 to 111_n, the information of the location-based group 110 may include each category information and information regarding the number of the clip data shared according to each category, as illustrated in FIG. 4.

Figure 4:
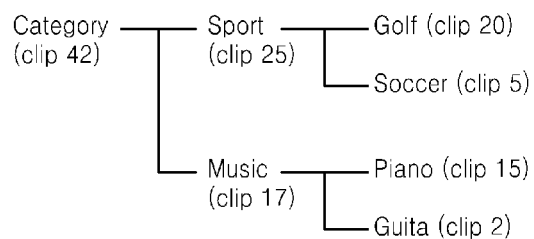
FIG. 4 illustrates information of a location-based group based on shared clip data, according to an exemplary embodiment of the present inventive concept.

FIG. 4 illustrates information of the location-based group 110 based on the shared clip data, according to an exemplary embodiment of the present inventive concept. Referring to FIG. 4, the number of clip data regarding sports from the clip data shared between the first through n-th devices 111_1 to 111_n is 25. The number of clip data regarding golf from the clip data regarding sports is 20. The number of clip data regarding soccer from the clip data regarding sports is 5, and the number of clip data regarding music from the clip data shared between the first through n-th devices 111_1 to 111_n is 17. The number of clip data regarding piano from the clip data regarding music is 15, and the number of clip data regarding guitar from the clip data regarding music is 2. The number of clip data illustrated in FIG. 4 may be represented by percentages. For example, the information of clip data regarding golf may be represented by 47.6% instead of 20. This means that the ratio of clip data regarding golf to the clip data shared between the first through n-th devices 111_1 to 111_n is 47.6%. In addition, the information about the location-based group 110 may further include user information, such as age and gender of a user who has collected the shared clip data, a clipping time and location information.

When the location-based group 110 is generated based on a connection to the LAN 112, regardless of the shared data described above, the user information of the second through n-th devices 111_2 to 111_n included in the information received from the at least one device may be the same as or different from information regarding the user who has collected the shared clip data. Thus, when the location-based group 110 is generated based on a connection to the LAN 12 regardless of the shared data described above, the user information of the second through n-th devices 111_2 to 111_n included in the information received from the at least one device may be defined as information regarding a user who has the second through n-th devices 111_2 to 111_n. When the information received in operation S301 is user information, the information of the location-based group 110 may include user information of the first through n-th devices 111_1 to 111_n.

When targeting information about the location-based group 110 based on the information of the location-based group 110 is received from the external device 130 via the external network 120 in operation S303, the processor 205 outputs the received information in operation S304. The processor 205 may output the received information to the output unit 204 included in the user interface unit 204 or to the output unit 204 and the second through n-th devices 111_2 to 111_n. The information targeted at the location-based group 110 may include information, such as advertising and local information.

Figure 5:
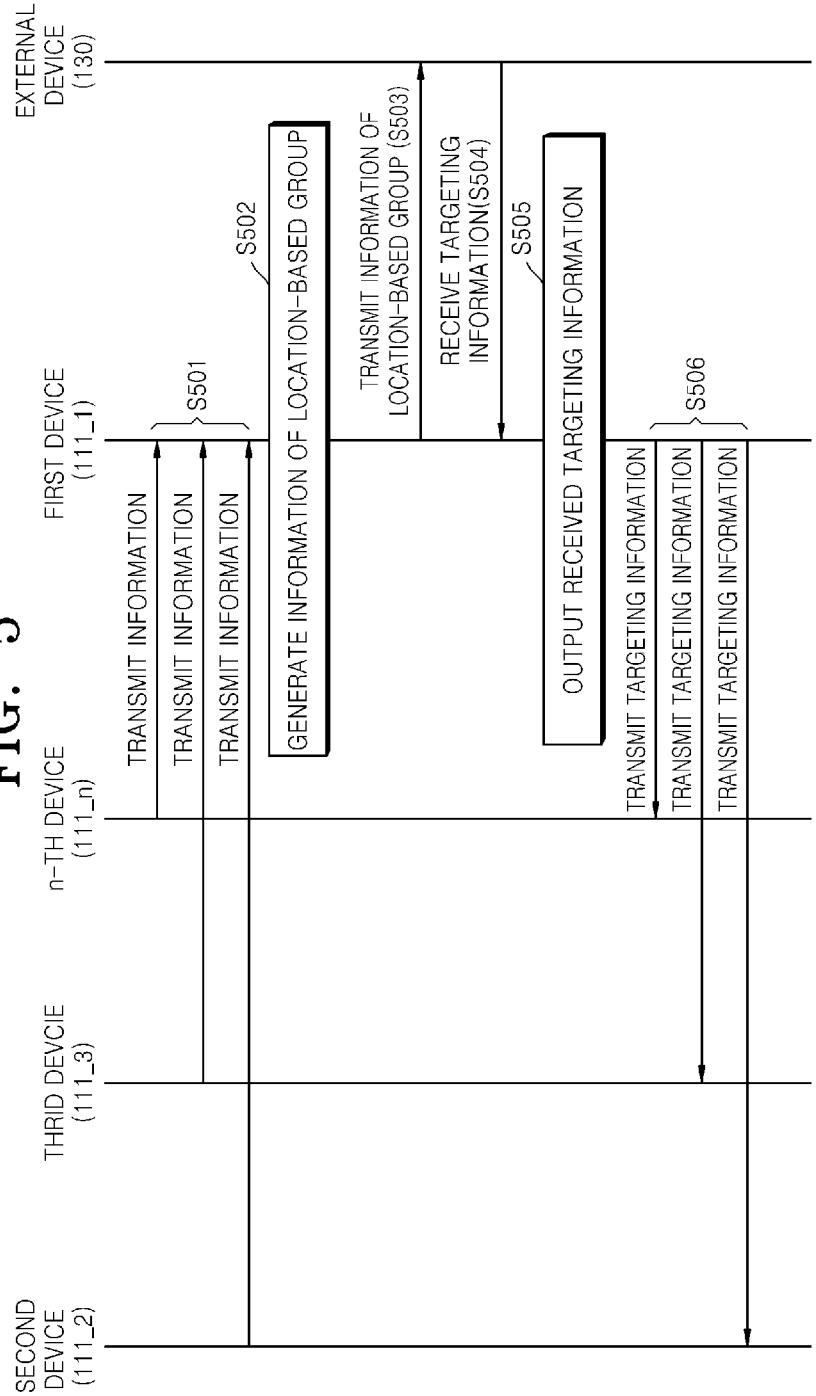
FIG. 5 is a flowchart illustrating the flowchart of FIG. 3 that is redefined based on elements of the network illustrated in FIG. 1.

FIG. 5 is a flowchart illustrating the flowchart of FIG. 3 that is redefined based on elements of the network 100 illustrated in FIG. 1.

Referring to FIGS. 1 and 5, when, in operation S501, the first device 111_1 receives information transmitted by the second through n-th devices 111_2 to 111_n via the LAN 112, the first device 111_1 generates information of the location-based group 110 based on the received information in operation S502. The information received in operation S501 is the same as information mentioned in operation S301 of FIG. 3, and the information received in operation S502 is the same as information of the location-based group 110 described in operation S302 of FIG. 3. The received information may be stored in the storage unit 203. When the information received from the second through n-th devices 111_2 to 111_n is the user information described above, the information of the location-based group 110 in FIGS. 3 and 5 may be the received information.

When the information of the location-based group 110 is generated, the first device 111_1 transmits the generated information of the location-based group 110 to the external device 130 via the external network 120 in operation S503. Thus, when targeting information of the location-based group 110 is received from the external device 130 in operation S504, the first device 111_1 may output the received targeting information of the location-based group 110 to the output unit 2042 of the first device 111_1 in operation S505, or may output the targeting information to the output unit 2042 of the first device 111_1 and simultaneously may transmit the targeting information to the second through n-th devices 111_2 to 111_n to output the targeting information to the second through n-th devices 111_2 to 111_n in operation S506.

Figure 6:
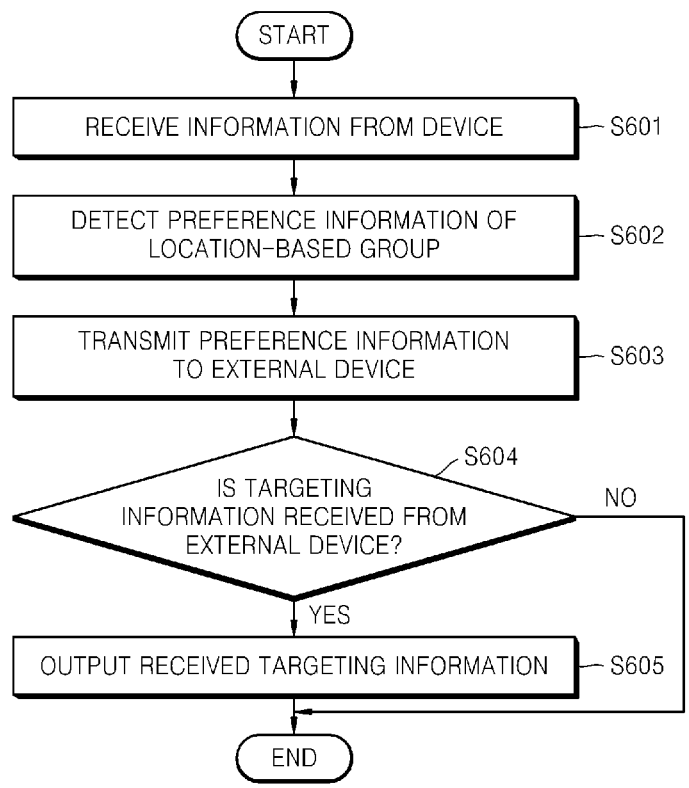
FIG. 6 is a flowchart illustrating a method of providing information by using an apparatus for providing information, according to another exemplary embodiment of the present inventive concept.

The processor 205 may perform a task for a method of providing information illustrated in a flowchart of FIG. 6. FIG. 6 is a flowchart illustrating a method of providing information by using an apparatus for providing information, according to another exemplary embodiment of the present inventive concept. In FIG. 6, targeting information of the location-based group 110 by using preference information of the location-based group 110 detected based on information received from at least one device included in the location-based group 110 is provided to each of first through n-th devices 111_1 to 111_n. Operations S601, S604 and S605 illustrated in FIG. 6 may be interpreted to correspond to operations S301, S303 and S304 illustrated in FIG. 3 and thus, a description thereof will not be provided here.

In operation S602, when the information received from at least one device from the second through n-th devices 111_2 to 111_n included in the location-based group 110 is the information regarding shared data illustrated in FIG. 3, the processor 205 detects preference information of the location-based group 110 based on the information regarding the received shared data. For example, when the information regarding the shared data is defined as illustrated in FIG. 4, the processor 205 may detect information regarding golf having the highest degree of from the shared data as the preference information of the location-based group 110.

In operation S603, the processor 205 transmits the preference information to the external device 130.

When the information received in operation S601 is user information of the second through n-th devices 111_2 to 111_n described in FIGS. 3 and 5, the processor 205 may not detect the preference information of the location-based group 110 based on user information of the first device 111_1 and user information regarding of second through n-th devices 111_2 to 111_n, but may transmit the user information described above, as illustrated in FIG. 3 or 4, to the external device 130 via the second communication unit 202 and the external network 120 or may transmit the user information to a database server (not shown) other than the external device 130 via the second communication unit 202, thereby detecting the preference information of the location-based group 110.

Figure 7:
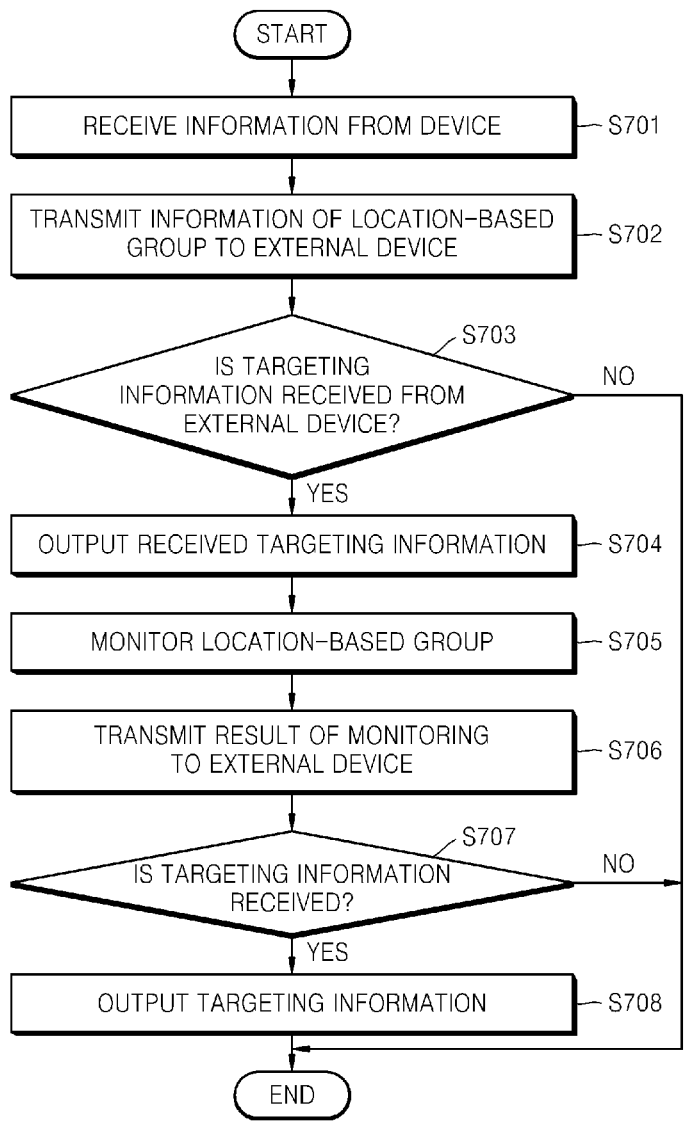
FIG. 7 is a flowchart illustrating a method of providing information by using an apparatus for providing information, according to another exemplary embodiment of the present inventive concept.

The processor 205 may perform a task for a method of providing information illustrated in a flowchart of FIG. 7. FIG. 7 is a flowchart illustrating a method of providing information by using an apparatus for providing information, according to another embodiment of the present invention. In FIG. 7, an operation of monitoring first through n-th devices 111_1 to 111_n after outputting targeting information is added to the flowchart of FIG. 3. Thus, operations S701 through S704 illustrated in FIG. 7 may be interpreted to correspond to operations S301 through S304 illustrated in FIG. 3 and thus, a description thereof will not be provided here.

After the targeting information regarding the location-based group 110 received in operation S704 is output, the processor 205 monitors the second through n-th devices 111_2 to 111_n included in the location-based group 110 in operation S705. The monitoring operation may be performed by predetermined time. The monitoring operation may be performed so as to determine whether a device included in the location-based group 110 is changed or whether information received from the second through n-th devices 111_2 to 111_n is changed.

It may be determined whether a device included in the location-based group 110 is changed by using a response signal to a signal broadcasted via the LAN 112, for example. That is, a device that transmits the response signal to the broadcasted signal may be determined to be included in the location-based group 110, and a device that does not transmit the response signal to the broadcasted signal may be determined not to be included in the location-based group 110. The information received from the second through n-th devices 111_2 to 111_n may be changed when data shared between the first through n-th devices 111_1 to 111_n is changed.

The processor 205 transmits the result of monitoring of the location-based group 110 to the external device 130 in operation S706. As a result of monitoring, even when a device included in the location-based group 110 has not be changed or the information received from the second through n-th devices 111_2 to 111_n has not been changed, the processor 205 may transmit the result of monitoring to the external device 130.

When at least one targeting piece of information regarding the location-based group 110 is received from the external device 130 based on the result of monitoring in operation S707, the processor 205 outputs the received targeting information in operation S708. When, as the result of monitoring, a device included in the location-based group 110 has not been changed or information received from the second through n-th devices 111_2 to 111_n has not been changed, the external device 130 may receive the result of monitoring and then may not transmit the targeting information regarding the location-based group 110.

Figure 8:
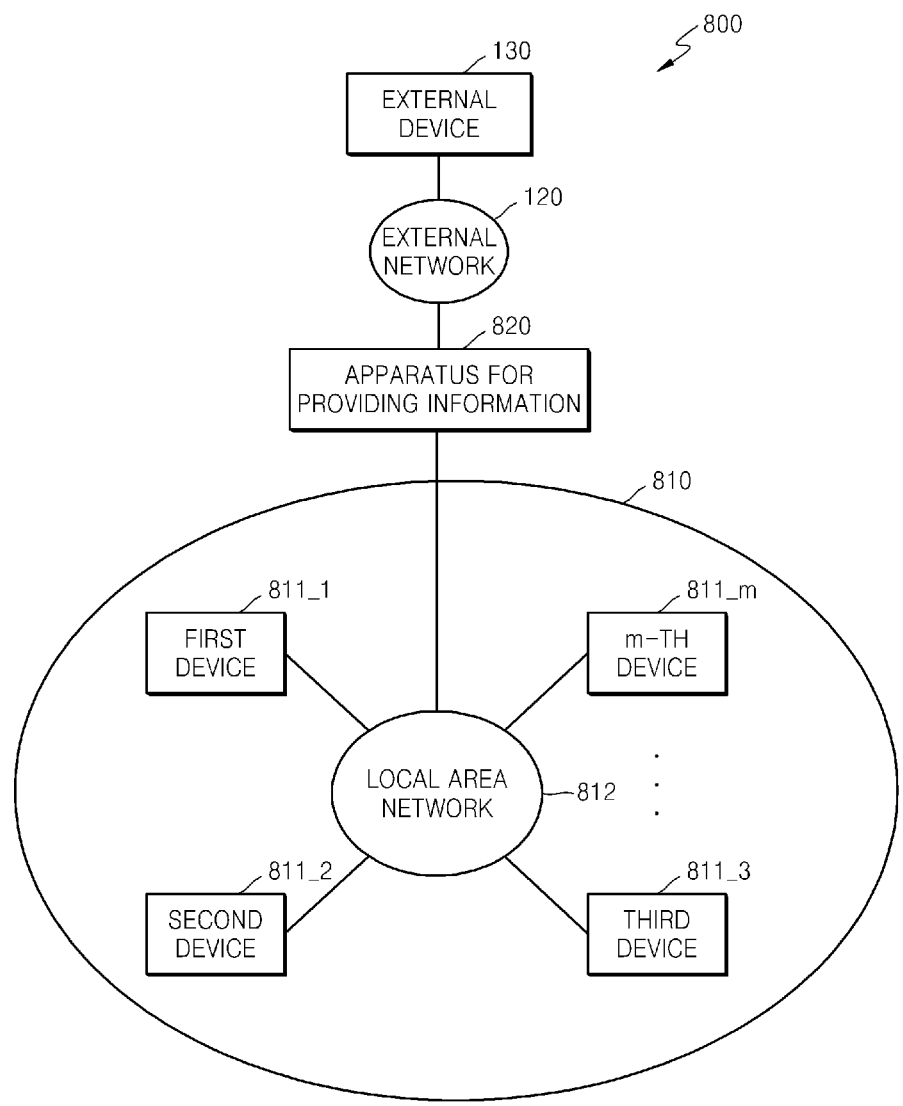
FIG. 8 illustrates a structure of a network in which an apparatus is used for providing information according to another exemplary embodiment embodiment of the present inventive concept.

FIG. 8 illustrates a structure of a network 800 in which an apparatus for providing information 820 according to another exemplary embodiment of the present inventive concept is used. In FIG. 8, the apparatus for providing information 820 is disposed adjacent to first through m-th devices 811_1 to 811_m included in a location-based group 810. In this case, m may have the same value as or a different value from n in FIG. 1, and the first through m-th devices 811_1 to 811_m may be devices, such as mobile nodes, mobile device or portable device, like the first through n-th devices 111_1 to 111_n, illustrated in FIG. 1.

The network 800 illustrated in FIG. 8 includes the location-based group 810, the apparatus for providing information 820, an external network 120 and an external device 130.

Since the external network 120 and the external device 130 illustrated in FIG. 8 may have the same structures as those of the external network 120 and the external device 130 illustrated in FIG. 1 and may perform the same operations as those thereof, they are denoted by like reference numerals and a description thereof will not be provided herein.

The location-based group 810 includes the first through m-th devices 811_1 to 811_m, like in the location-based group 110 of FIG. 1. However, the apparatus for providing information 820 is not included in the location-based group 810 of FIG. 8, unlike in the location-based group 110 of FIG. 1. The location-based group 810 of FIG. 8 may be defined to be the same as the location-based group 110 of FIG. 1 except for the apparatus for providing information 820 separate from the location-based group 810.

The apparatus for providing information 820 may have a display function and may receive information from each of the first through m-th devices 811_1 to 811_m via a local area network (LAN) 812. However, the apparatus for providing information 820 may receive information from at least one among the first through m-th devices 811_1 to 811_m so as to provide information according to the present invention. Information received from each of the first through m-th devices 811_1 to 811_m or information received from at least one among the first through m-th devices 811_1 to 811_m may include information received from the second through n-th devices 111_2 to 111_n described in regard to the location-based group 110 of FIG. 1.

The apparatus for providing information 820 transmits information of the location-based group 810 based on the information received from each of the first through m-th devices 811_1 to 811_m or one device therefrom to the external device 130 via the external network 120 and outputs at least one piece of targeting information received from the external device 130 to the apparatus for providing information 820.

Figure 9:
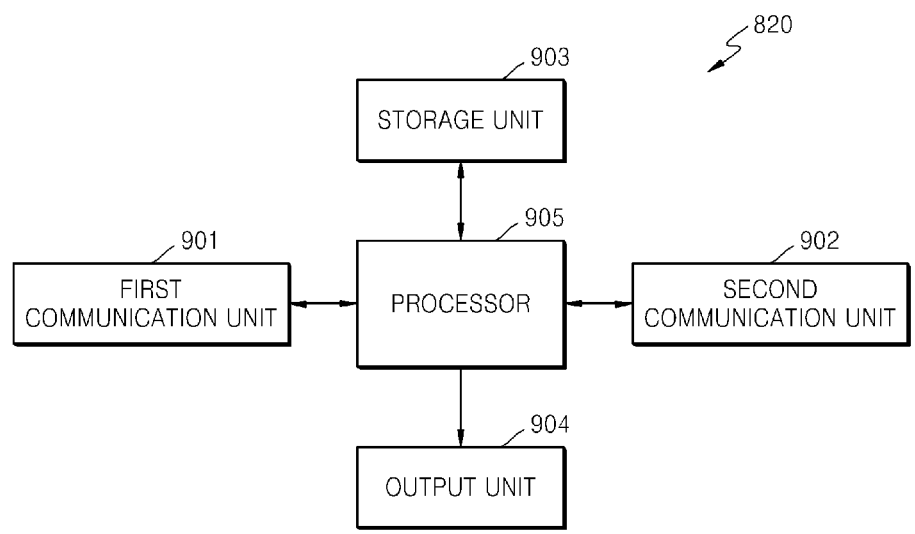
FIG. 9 is a functional block diagram of the apparatus for providing information illustrated in FIG. 8.

To this end, the apparatus for providing information 820 may be constituted, as illustrated in FIG. 9. Referring to FIG. 9, the apparatus for providing information 820 may include a first communication unit 901, a second communication unit 902, a storage unit 903, an output unit 904 and a processor 905.

The first communication unit 901, the second communication unit 902 and the storage unit 903 may perform similar operations to those of the first communication unit 201, the second communication unit 202 and the storage unit 203 of FIG. 2 and may have the same structures as those thereof.

The processor 905 may perform a method of providing information, as in the flowcharts of FIGS. 3, 6, and 7. In this regard, the processor 905 may perform the method of providing information as illustrated in FIGS. 3, 6 and 7 based on information received from each of the first through m-th devices 811_1 to 811_m or information received from at least one among the first through m-th devices 811_1 to 811_m.

Figure 10:
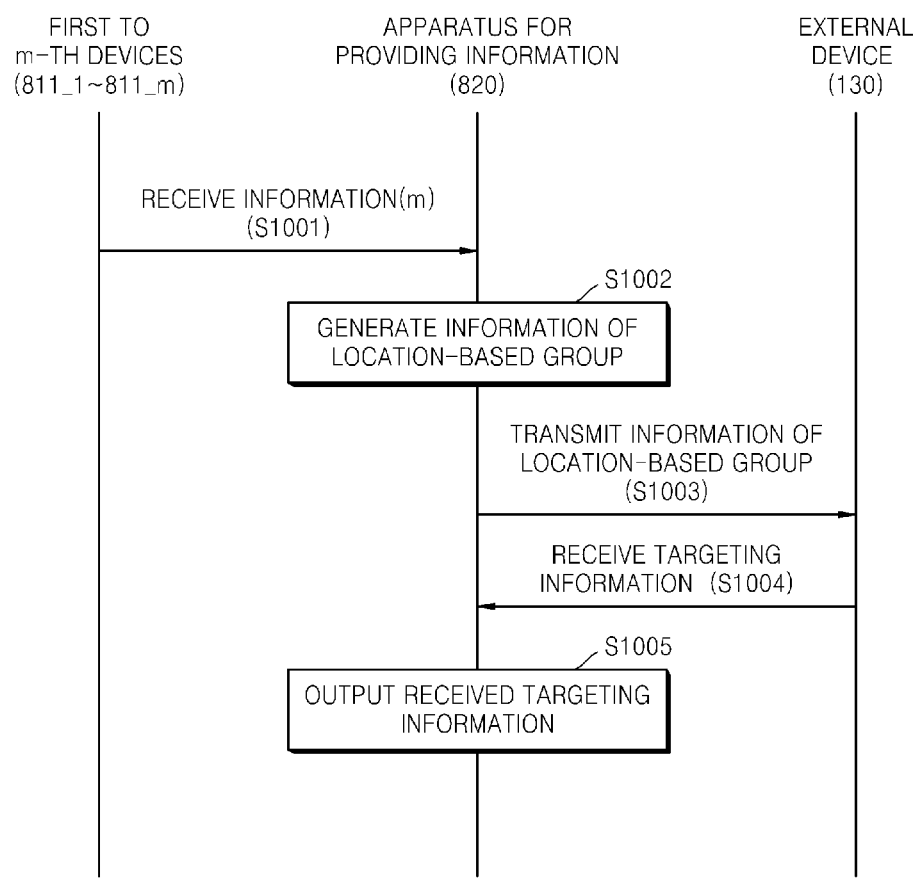
FIG. 10 is a flowchart illustrating the flowchart of FIG. 3 that is redefined based on elements of the network illustrated in FIG. 8.

FIG. 10 is a flowchart illustrating the flowchart of FIG. 3 that is redefined based on elements of the network 800 illustrated in FIG. 8.

Referring to FIGS. 8 and 10, in operation S1001, when the apparatus for providing information 820 receives information from the first through m-th devices 811_1 to 811_m via the LAN 812, the apparatus for providing information 820 generates information of the location-based group 810 based on the received information in operation S1002. Information received in operation S1001 is the same as information described in operation S301 of FIG. 3, and information generated in operation S1002 is the same as information of the location-based group 110 described in operation S302 of FIG. 3. The received information may be stored in the storage unit 903. When the information received from the first through m-th devices 811_1 through 811_m is the user information described above, information of the location-based group 810 in FIGS. 8 and 10 may be the same as the received information.

When information of the location-based group 810 is generated, the apparatus for providing information 820 transmits the generated information of the location-based group 810 to the external device 130 via the external network 120 in operation S1003. Thus, when the targeting information of the location-based group 810 is received from the external device 130 in operation S1004, the apparatus for providing information 820 outputs the received targeting information regarding the location-based group 810 to the output unit 904 of the apparatus for providing information 820 in operation S1005. The apparatus for providing information 820 illustrated in FIGS. 8 through 10 may be a display device installed at a public place.

Figure 11:
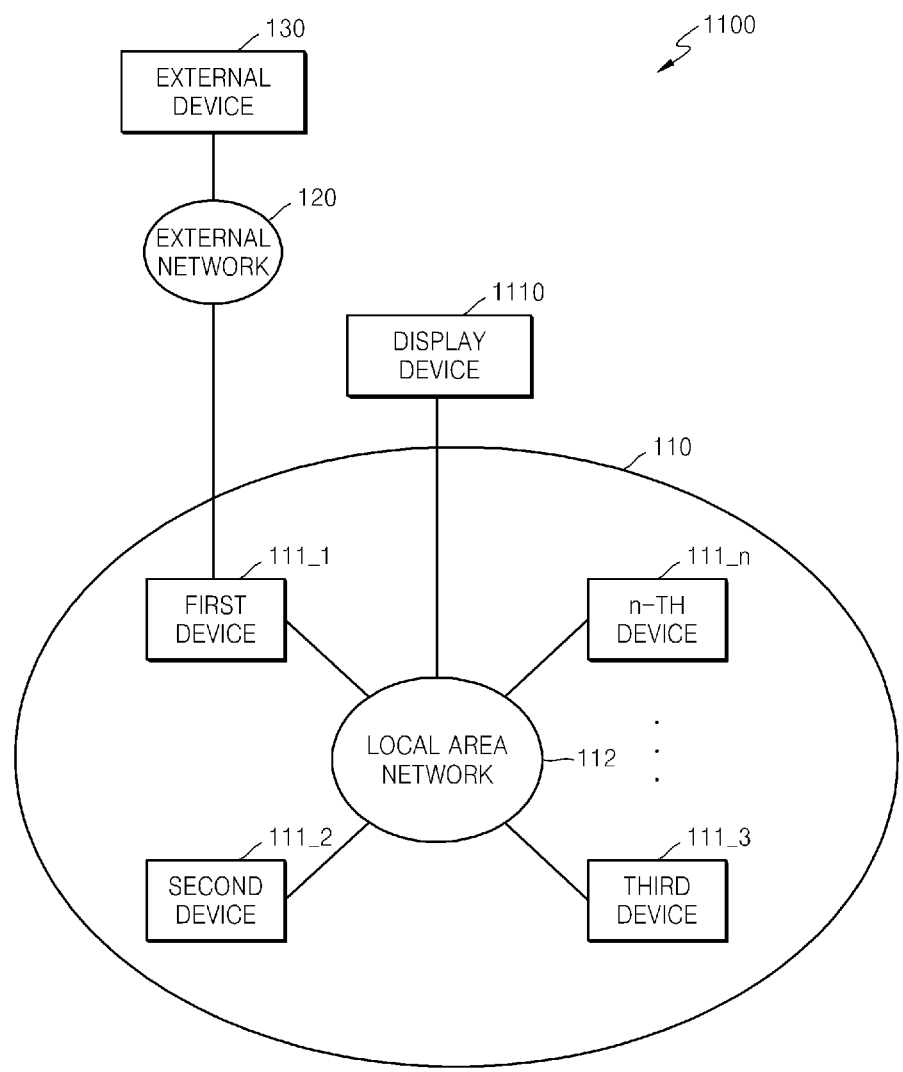
FIG. 11 illustrates a structure of a network in which an apparatus is used for providing information according to another exemplary embodiment of the present inventive concept.

FIG. 11 illustrates a structure of a network 1100 in which an apparatus for providing information according to another exemplary embodiment of the present inventive concept is used. In FIG. 11, an apparatus for providing information according to an exemplary embodiment of the present inventive concept is at least one device, i.e., a first device 111_1 included in the location-based group 110, as illustrated in FIG. 1. However, unlike in FIG. 1, FIG. 11 illustrates a structure of the network 1100 in which targeting information regarding the location-based group 110 is output using a display apparatus 1110 disposed adjacent to first through n-th devices 111_1 to 111_n included in the location-based group 110. Thus, an operation of outputting the targeting information received from the external device 130 in the network 1100 illustrated in FIG. 11 is different from the network 100 illustrated in FIG. 1.

That is, when the first device 111_1 receives at least one piece of targeting information regarding the location-based group 110 from the external device 130, as illustrated in FIGS. 1 through 7, the received at least one piece of targeting information is output to the display apparatus 1110 connected to the LAN 112. To this end, the display apparatus 1100 needs to have a function of being connected to the LAN 112. The display apparatus 1100 may be installed in a fixed location.

Figure 12:
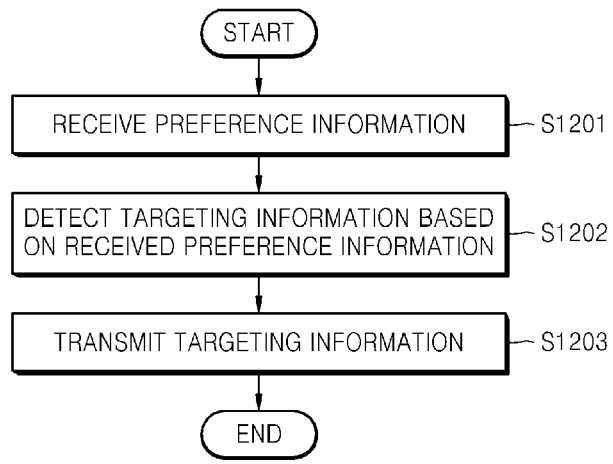
FIG. 12 is a flowchart illustrating a method of providing information in an external device, according to another exemplary embodiment of the present inventive concept.
Figure 13:
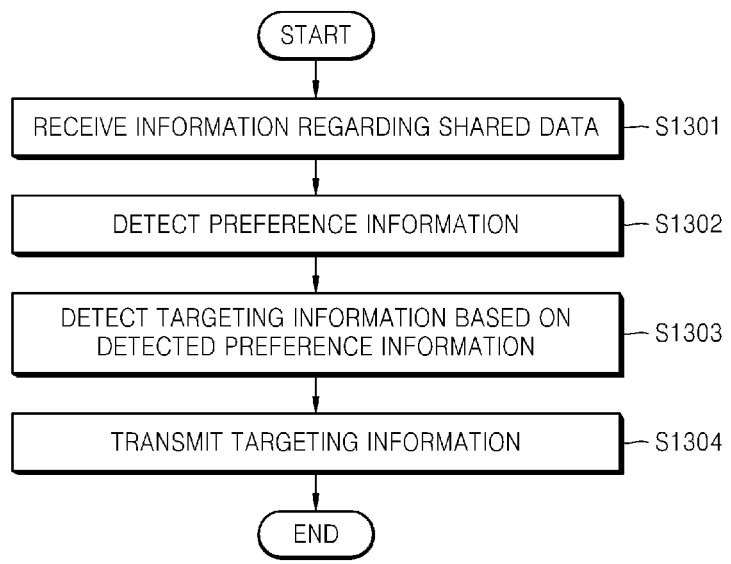
FIG. 13 is a flowchart illustrating a method of providing information in an external device, according to another exemplary embodiment of the present inventive concept.

The external device 130 illustrated in FIGS. 1, 8 and 11 may operate according to one of the flowcharts of the method of providing information illustrated in FIGS. 12 through 14. Hereinafter, for convenience of explanation, the external device 130 will be described with reference to FIG. 8. However, the following detailed description may be also applied to FIGS. 1 and 11.

FIG. 12 is a flowchart illustrating a method of providing information in an external device 130, according to another exemplary embodiment of the present inventive concept. Referring to FIGS. 8 and 12, when the external device 130 receives preference information of the location-based group 810 from the apparatus for providing information 820 via the external network 120 in operation S1201, the external device 130 detects at least one targeting information for the location-based group 810 based on the received preference information in operation S1202. The targeting information may be stored in advance in the external device 130, a database server (not shown) connected to the external device 130, or a storage unit (not shown) based on a cloud service, so that the targeting information can be detected based on the preference information. For example, when the preference information is information regarding golf, as illustrated in FIG. 4, the targeting information may be stored in advance so that information, such as advertising and local information, can be provided as the targeting information.

When the at least one piece of targeting information is detected, the external device 130 transmits the detected targeting information to the apparatus for providing information 820 via the external network 120, in operation S1203.

FIG. 13 is a flowchart illustrating a method of providing information in the external device 130, according to another exemplary embodiment of the present inventive concept. In FIG. 13, information regarding shared data of the location-based group 810 is received from the apparatus for providing information 820. However, information regarding shared data, as illustrated in FIGS. 3 through 7 may be user information of the first through m-th devices 811_1 to 811_m included in the location-based group 810.

Referring to FIGS. 8 and 13, when the external device 130 receives information regarding the shared data of the location-based group 810 from the apparatus for providing information 820 via the external network 120 in operation S1301, the external device 130 detects preference information of the location-based group 810 based on the received information regarding shared data in operation S1302. When the received information is not the information regarding shared data but rather is user information as described above, the external device 130 may detect preference information based on the user information. The user information may include information regarding user's age, gender, and residence. The operation of detecting the information regarding shared data and the preference information of the shared data may be interpreted as illustrated in FIGS. 3 through 7.

The operation S1303 of detecting at least one piece of targeting information based on the detected preference information and the operation S1304 of transmitting the detected at least one piece of targeting information to the apparatus for providing information 820 may be interpreted as explained with regard to operations S1202 and S1203 of FIG. 12.

FIG. 14 is a flowchart illustrating a method of providing information in the external device 130, according to another embodiment of the present invention. In FIG. 14, an operation of receiving information obtained by monitoring the location-based group 810 from the apparatus for providing information 820 first through n-th devices 111_1 to 111_n after transmitting at least one piece of targeting information to the apparatus for providing information 820, is added to the flowchart of FIG. 12.

Referring to FIGS. 8 and 14, when the external device 130 receives preference information of the location-based group 810 from the apparatus for providing information 820 via the external network 120 in operation S1401, the external apparatus 130 detects at least one targeting information of the location-based group 810 based on the received preference information in operation S1402. The targeting information may be stored in the external device 130, a database server (not shown) connected to the external device 130, or a storage unit (not shown) based on a cloud service, so that the targeting information can be detected based on the preference information, as illustrated in FIG. 12.

When the at least one piece of targeting information is detected, the external device 130 transmits the detected targeting information to the apparatus for providing information 820 via the external network 120 in operation S1403.

When, after transmitting the detected targeting information to the apparatus for providing information, the result of monitoring the location-based group 810 is received from the apparatus for providing information 820 in operation S1404, the external device 130 collects information based on the result of monitoring in operation S1405.

For example, an advertising exposure index may be collected. The advertising exposure index is information indicating a degree of evaluation at which transmitted advertising is exposed to devices included in the location-based group 810 when the targeting information transmitted in operation S1403 is advertising. That is, when, as the result of monitoring, the first through m-th devices 811_1 to 811_m included in the location-based group 810 have not been changed for a predetermined amount of time, the external device 130 may collect an advertising exposure index indicating a degree of exposure at which advertising provided to the location-based group 810 is exposed to the first through m-th devices 811_1 to 811_m, for a predetermined amount of time. However, when, as the result of monitoring, a device included in the location-based group 810 has been changed or information received from the location-based group 810 has been changed so that advertising provided to the location-based group 810 has been changed, the advertising exposure index collected by the external device 130 may be changed or updated. The information collected according to the result of monitoring is not limited to the advertising exposure index described above.

In operation S1406, the external device 130 checks whether the preference information of the location-based group 810 has been changed, by collecting the information based on the result of monitoring in operation S1405. When, as a result of checking, the preference information has been changed, the external device 130 detects at least one targeting piece of information based on the changed preference information in operation S1407. The operation S1407 of detecting the targeting information may be performed in the same manner as the operation S1402 of detecting the targeting information, as described above.

The external device 130 transmits the detected targeting information to the apparatus for providing information 820 in operation S1408. Thus, the apparatus for providing information 820 may provide the targeting information based on the changed preference information to a device included in the location-based group 810.

The operation of receiving the preference information illustrated in FIG. 14 may be modified into an operation of detecting preference information from received shared data, as illustrated in FIG. 13.

FIG. 13 may be modified in such a way that operations S1404 through S1408 illustrated in FIG. 14 are added to operation S1304.

The external device 130 may be constituted to include a processor, a storage unit and an external network interface unit so as to perform the operations illustrated in FIGS. 12 through 14, as described above.

The invention can also be embodied as computer readable codes on a computer readable recording medium, such as a non-volatile computer readable storage medium. The computer readable recording medium may be any data storage device that can store data structure which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing information in a location-based group, the method comprising:
   receiving, by a first device, information from at least one device included in the location-based group, the first device having a user interface for outputting information, the first device being included in the location-based group and being connected to the at least one device via a network;
   transmitting, by the first device, to an external device, information of the location-based group based on the received information;
   receiving, by the first device, from the external device at least one piece of targeting information based on the information of the location-based group; and
   transmitting, by the first device, the received at least one piece of targeting information via the network to a display device disposed adjacent to the at least one device included in the location-based group and connected to the first device and the at least one device via the network to display the received at least one piece of targeting information on the display device.

2. The method of claim 1, further comprising:
   after transmitting the targeting information, monitoring a plurality of devices included in the location-based group;
   transmitting a result of monitoring to the external device; and
   in response to at least one piece of targeting information regarding the location-based group being received from the external device based on the result of monitoring, transmitting the received at least one piece of targeting information to the display device.

3. The method of claim 2, wherein the monitoring of the plurality of devices comprises at least one of determining whether a device included in the location-based group has been changed, and determining whether information received from the at least one device has been changed.

4. The method of claim 1, wherein the information received from the at least one device included in the location-based group includes at least one of information regarding data shared between a plurality of devices included in the location-based group and user information of the plurality of devices included in the location-based group.

5. The method of claim 4, wherein the shared data comprises data clipped using a clipping function of the at least one device.

6. The method of claim 1, wherein the information of the location-based group comprises at least one among preference information of a plurality of devices included in the location-based group, information regarding data shared between the plurality of devices included in location-based group, and user information of the plurality of devices included in the location-based group.

7. The method of claim 1, wherein the information of the location-based group comprises preference information based on information regarding data shared between a plurality of devices included in the location-based group.

8. The method of claim 1, wherein the transmitting information of the location-based group based on the received information to an external device comprises:
    when the received information is information regarding data shared between a plurality of devices included in the location-based group, detecting preference information of the location-based group based on the information regarding the shared data; and
    transmitting the preference information as the information of the location-based group to the external device.

9. The method of claim 1, further comprising:
    outputting the received at least one piece of targeting information via the at least one device included in the location-based group.

10. The method of claim 1, wherein the targeting information comprises at least one piece of information from advertising and local information.

11. A non-transitory computer readable storage medium having recorded thereon a program, wherein the program, when executed by a processor, causes the processor to execute the method of claim 1.

12. A method of providing information, comprising:
    receiving information from a location-based group;
    transmitting to an external device, information of the location-based group based on the received information;
    receiving from the external device at least one piece of targeting information based on the information of the location-based group; and
    outputting the received at least one piece of targeting information,
    wherein, when the method is performed by a device disposed adjacent to a plurality of devices included in the location-based group, the outputting of the received at least one piece of targeting information comprises outputting by the device adjacent to the plurality of devices, the received at least one piece of targeting information, and the device adjacent to the plurality of devices has a display function.

13. An apparatus for providing information in a location-based group, the apparatus comprising:
    a first communication unit for performing communication with at least one device included in the location-based group, the apparatus being included in the location-based group and being connected to the at least one device via a network;
    a second communication unit for performing communication with an external device; and
    a processor for transmitting information of the location-based group based on the information received via the first communication unit to the external device via the second communication unit, receiving at least one piece of targeting information based on the information of the location-based group from the external device and transmitting the received at least one piece of targeting information via the network to a display device disposed adjacent to the at least one device included in the location-based group and connected to the apparatus and the at least one device via the network to display the received at least one piece of targeting information on the display device,
    wherein the apparatus is a device disposed- adjacent to a plurality of devices included in the location-based group and further comprises a user interface for outputting the received at least one piece of targeting information.

14. The apparatus of claim 13, wherein, after transmitting the at least one piece of targeting information, the processor monitors a plurality of devices included in the location-based group via the first communication unit and transmits a result of monitoring to the external device via the second communication unit, and in response to at least one piece of targeting information regarding the location-based group being received from the external device based on the result of monitoring via the second communication unit, the processor transmits the received at least one piece of targeting information to the display device.

15. The apparatus of claim 13, wherein the information received from the at least one device included in the location-based group includes at least one of information regarding data shared between a plurality of devices included in the location-based group and user information of the plurality of devices included in the location-based group.

16. The apparatus of claim 15, wherein the shared data comprises data clipped using a clipping function of the at least one device.

17. The apparatus of claim 13, wherein the information of the location-based group comprises at least one among preference information of the location-based group detected from the received information, information regarding data shared between a plurality of devices included in the location-based group, and user information of the plurality of devices included in the location-based group.

18. The apparatus of claim 13, wherein the targeting information comprises at least one of advertising and local information.

19. An apparatus for providing information in a location-based group, the apparatus comprising:
    a first communication unit for performing communication with at least one device included in the location-based group;
    a second communication unit for performing communication with an external device; and
    a processor for transmitting information of the location-based group based on the information received via the first communication unit to the external device via the second communication unit, receiving at least one piece of targeting information based on the information of the location-based group from the external device and transmitting the received at least one piece of targeting information to a display device disposed adjacent to the at least one device included in the location-based group to display the received at least one piece of targeting information on the display device,
    wherein the apparatus is one from a plurality of devices included in the location-based group, and the processor outputs the received at least one piece of targeting information by using the plurality of devices.

* * * * *